United States Patent
Minoura et al.

(10) Patent No.: US 10,908,469 B2
(45) Date of Patent: Feb. 2, 2021

(54) DISPLAY DEVICE

(71) Applicants: Sharp Kabushiki Kaisha, Sakai (JP); Sakai Display Products Corporation, Sakai (JP)

(72) Inventors: Kiyoshi Minoura, Sakai (JP); Hiroshi Tsuchiya, Sakai (JP); Shinji Shimada, Sakai (JP); Yuhki Kobayashi, Sakai (JP); Yozo Narutaki, Sakai (JP)

(73) Assignees: SHARP KABUSHIKI KAISHA, Sakai (JP); SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 16/649,154

(22) PCT Filed: Sep. 29, 2017

(86) PCT No.: PCT/JP2017/035708
§ 371 (c)(1),
(2) Date: Mar. 20, 2020

(87) PCT Pub. No.: WO2019/064575
PCT Pub. Date: Apr. 4, 2019

(65) Prior Publication Data
US 2020/0249509 A1   Aug. 6, 2020

(51) Int. Cl.
*G02F 1/1335* (2006.01)
*G02F 1/1368* (2006.01)
*G02F 1/1339* (2006.01)
*G02F 1/1362* (2006.01)

(52) U.S. Cl.
CPC .......... *G02F 1/1368* (2013.01); *G02F 1/1339* (2013.01); *G02F 1/136227* (2013.01); *G02F 2201/123* (2013.01); *G02F 2203/02* (2013.01)

(58) Field of Classification Search
CPC ..................................................... G02F 1/1368
See application file for complete search history.

(56) References Cited

U.S. PATENT DOCUMENTS

2006/0072047 A1*   4/2006   Sekiguchi ............. G02F 1/1335
                                                                        349/25

FOREIGN PATENT DOCUMENTS

| JP | 2002-196702 | * | 7/2002 | .......... G02F 1/1335 |
| JP | 2002-196702 A | | 7/2002 | |
| JP | 2003-076302 | * | 3/2003 | .......... G02F 1/1333 |
| JP | 2003-076302 A | | 3/2003 | |
| JP | 2015-181137 A | | 10/2015 | |
| WO | 2004/053819 A1 | | 6/2004 | |

OTHER PUBLICATIONS

Official Communication issued in International Patent Application No. PCT/JP2017/035708, dated Nov. 14, 2017.

* cited by examiner

*Primary Examiner* — Sang V Nguyen
(74) *Attorney, Agent, or Firm* — Keating & Bennett, LLP

(57) ABSTRACT

A display device includes a first substrate including a light-emitting element that is an upward light emission type and a transistor in a lower layer than the light-emitting element, a second substrate facing the first substrate, and a liquid crystal layer disposed between the first substrate and the second substrate. The first substrate includes a sealing film formed in an island shape and covering the light-emitting element, a pixel electrode including a first portion not overlapping the sealing film, and a light reflective film overlapping the first portion and including a recessed and protruded surface.

11 Claims, 8 Drawing Sheets

DISPLAY DEVICE

TECHNICAL FIELD

The disclosure relates to a display device.

BACKGROUND ART

PTL 1 discloses a display device for performing light emission display by an EL light-emitting element and liquid crystal display by a reflective liquid crystal element.

CITATION LIST

Patent Literature

PTL 1: WO 2004/053819 (published on Jun. 24, 2004)

SUMMARY

Technical Problem

In a known display device, a light-emitting region is the same for both light emission display and reflective liquid crystal display, and this causes problems that optimal design for the reflective liquid crystal display is not possible and the luminance is insufficient when performing the reflective liquid crystal display.

Solution to Problem

A display device according to an aspect of the disclosure is a display device including a first substrate including a light-emitting element that is an upward light emission type and a transistor in a lower layer than the light-emitting element, a second substrate facing the first substrate, and a liquid crystal layer disposed between the first substrate and the second substrate. The first substrate includes a sealing film formed in an island shape and covering the light-emitting element, a pixel electrode including a first portion not overlapping the sealing film, and a light reflective film overlapping the first portion and including a recessed and protruded surface.

Advantageous Effects of Disclosure

Since the light-emitting element is not formed in the region overlapping the first portion, optimal design for the reflective liquid crystal display is possible. As a result, the luminance when performing the reflective liquid crystal display can be increased.

DESCRIPTION OF EMBODIMENTS

First Embodiment

In the following description, "the same layer" refers to a layer formed of the same material through the same process, "a lower layer" refers to a layer formed in a process before a process in which a layer to be compared is formed, and "an upper layer" refers to a layer formed in a process after the process in which the layer to be compared is formed. Also, "overlapping" refers to a case that two members include an overlapping portion in a plan view and includes a case that another member is interposed between the two members and a case that another member is not interposed therebetween.

FIG. 1(a) is a plan view illustrating a display device according to the first embodiment, and FIG. 1(b) is a circuit diagram illustrating a configuration example of a subpixel. As illustrated in FIG. 1(a), a display device 3 according to the first embodiment includes a display portion 3d including a red subpixel SP(R), a green subpixel SP(G), and a blue subpixel SP(B), a driver circuit DRC configured to drive the display portion 3d, an external light sensor LS, and a display control circuit DCC.

Figure 1:
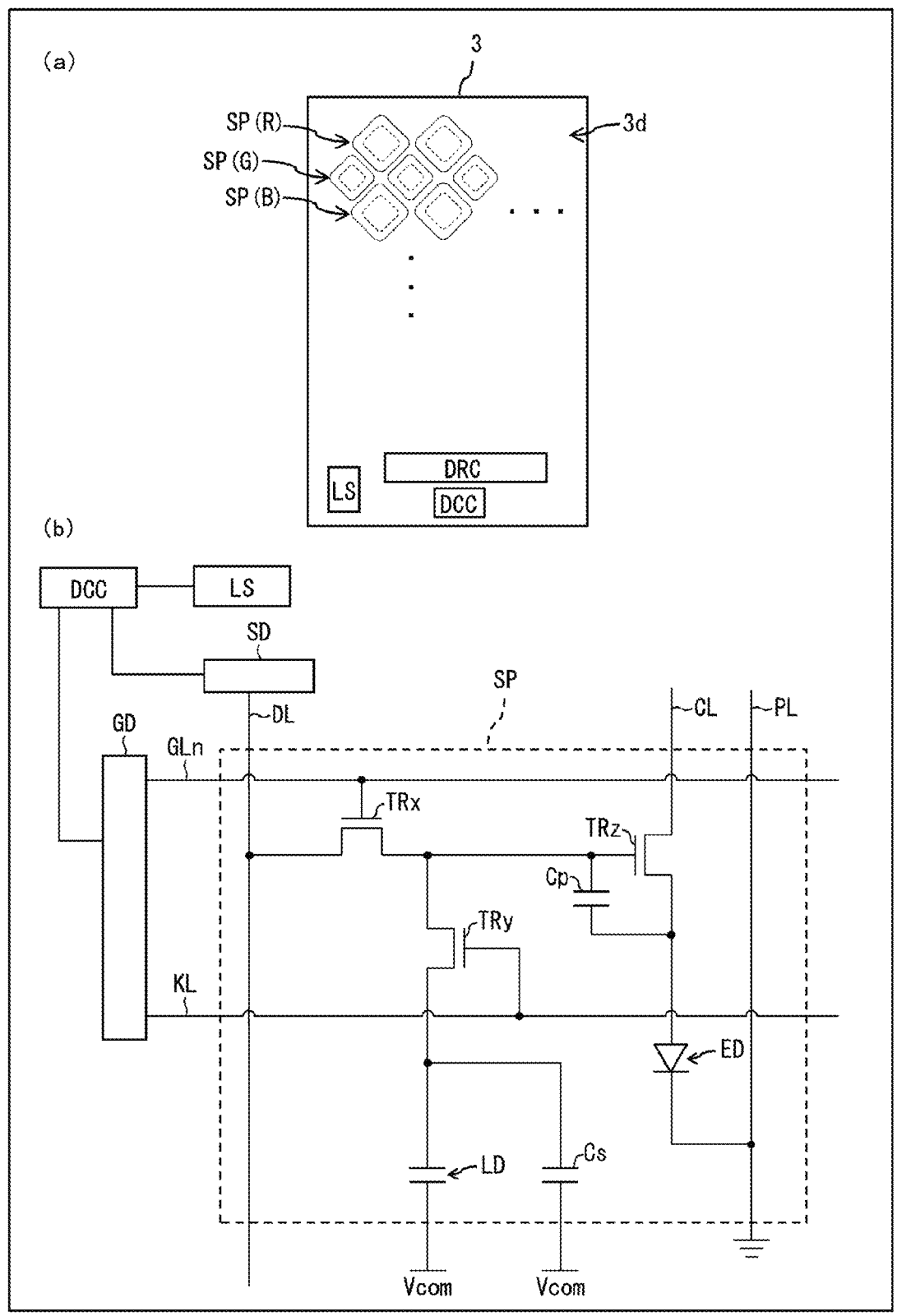
FIG. 1(a) is a plan view illustrating a display device according to a first embodiment.
FIG. 1(b) is a circuit diagram illustrating a configuration example of a subpixel.

As illustrated in FIG. 1, the display portion 3d is provided with a data line DL, a gate line GLn, a switching line KL, a current line CL, and a ground line PL. The driver circuit DRC includes a source driver SD configured to drive the data line DL and a gate driver GD configured to drive the gate line GLn and the switching line KL. The display control circuit DCC controls the source driver SD and the gate driver GD on the basis of output (an external light amount) of the external light sensor LS.

The subpixel SP includes a light-emitting element ED (for example, an organic light-emitting diode), a reflective liquid crystal element (a reflective liquid crystal capacitance) LD, transistors TRx, TRy, TRz, and capacitances Cp, Cs. For example, the red subpixel SP(R) includes the reflective liquid crystal element LD including a red color filter and the light-emitting element ED configured to emit red light.

In a period of time at which the switching line KL is inactive (the external light amount is less than a threshold), the transistor TRy is off, and in a case that the gate line GLn is activated, a gray scale signal for light emission display is input via the data line DL and the transistor TRx, and the capacitance Cp is charged in accordance with the gray scale. Then, in a case that the current line CL is activated, the current flows to the light-emitting element ED via the transistor TRz, and the light-emitting element ED emits light at a luminance corresponding to the gray scale. A cathode of the light-emitting element ED is connected to the ground line PL.

In a period of time at which the switching line KL is active (the external light amount is equal to or greater than the threshold), the transistor TRy is on, and in a case that the gate line GLn is activated, a gray scale signal for reflective liquid crystal display is input via the data line DL, the transistor TRx, and the transistor TRy, and the reflective liquid crystal element (a reflective liquid crystal capacitance) LD is charged in accordance with the gray scale. This provides the reflective liquid crystal element LD with a transmittance corresponding to the gray scale, and reflected light passes through the reflective liquid crystal element LD. The capacitance Cs functions as an auxiliary capacitance of the reflective liquid crystal element LD.

Figure 2:
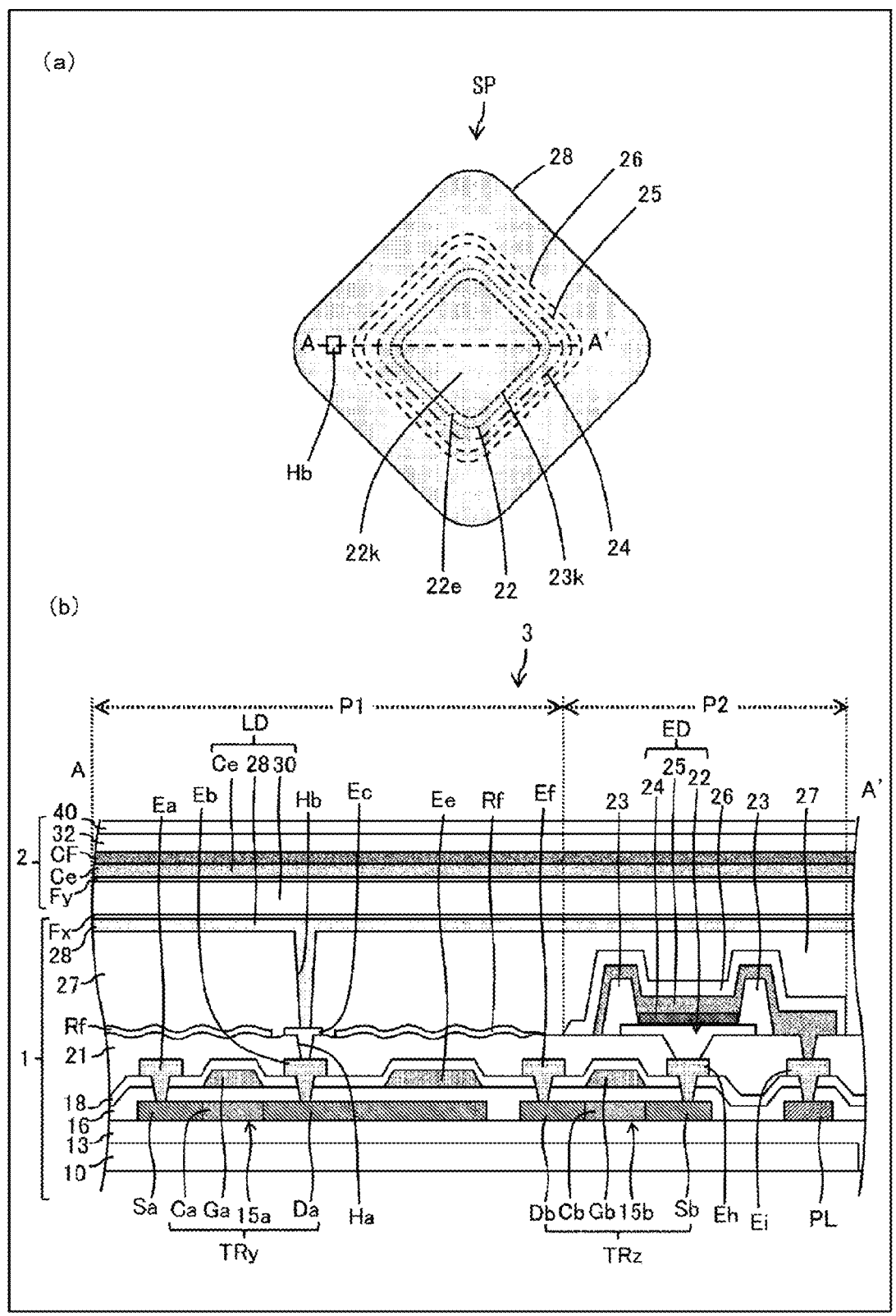
FIG. 2(a) is a plan view illustrating a configuration example of a subpixel.
FIG. 2(b) is a cross-sectional view passing through the subpixel of a display portion.

FIG. 2(a) is a plan view illustrating a configuration example of a subpixel, and FIG. 2(b) is a cross-sectional view passing through the subpixel of the display device. As illustrated in FIG. 2, in the display device 3, a first substrate (a lower substrate) 1, a liquid crystal layer 30, a second substrate (an upper substrate) 2, and a circular polarizer 40 are layered in this order.

In the first substrate 1, a barrier layer 13; semiconductor films 15a, 15b; an inorganic insulating film 16; electrodes Ga, Ee, Gb; an inorganic insulating film 18; electrodes Ea, Eb, Ef, Eh, Ei; an interlayer insulating film 21; a light reflective film Rf, an electrode Ec, and an anode 22; a light-emitting layer 24; a cathode 25; a sealing film 26; a flattening film 27; a pixel electrode 28; and an alignment film Fx are layered on a base material 10 in this order. In the second substrate 2, a color filter CF, a counter electrode Ce, and an alignment film Fy are layered on a base material 32 in this order.

The subpixel SP is provided with the light-emitting element ED and the reflective liquid crystal element LD. The light-emitting element ED includes the anode 22 (a lower electrode), the light-emitting layer 24, and the cathode 25 (an upper electrode). The reflective liquid crystal element LD includes the pixel electrode 28, the liquid crystal layer 30, and the counter electrode Ce. The light-emitting element ED is covered with the sealing film 26 having an island shape.

Examples of the material of the base material 10 include glass and polyethylene terephthalate (PET). The barrier layer 13 is a layer that prevents foreign matter such as moisture or oxygen from reaching the transistors TRy, TRz, the light-emitting layer 24, or the like and can be configured by a silicon oxide film, a silicon nitride film, a silicon oxynitride film, or by a layered film of these, formed by chemical vapor deposition (CVD).

The semiconductor films 15a, 15b are formed of low-temperature polysilicon (LTPS) or an oxide semiconductor, for example. The semiconductor film 15a includes a channel portion Ca, a source portion Sa, and a drain portion Da, and the semiconductor film 15b includes a channel portion Cb, a source portion Sb, and a drain portion Db.

The inorganic insulating films 16, 18 can be configured by a silicon oxide (SiOx) film, a silicon nitride (SiNx) film, or a layered film of these, formed by CVD.

The electrodes Ga, Gb, Ea, Eb, Ee, Ef, Eh, Ei are configured by a single layer film or a layered film of metal including at least one of aluminum (Al), tungsten (W), molybdenum (Mo), tantalum (Ta), chromium (Cr), titanium (Ti), and copper (Cu), for example.

The transistor TRy (see FIG. 1(b)) includes the semiconductor film 15a and the electrode Ga (a gate electrode) overlapping the channel portion Ca, with the inorganic insulating film 16 interposed therebetween. The transistor TRz (see FIG. 1(b)) includes the semiconductor film 15b and the electrode Gb (a gate electrode) overlapping the channel portion Cb, with the inorganic insulating film 16 interposed therebetween.

The interlayer insulating film 21 is a film covering the electrodes Ea, Eb, Ef, Eh, Ei, which are referred to as a source metal (a source layer) and can be formed of a coatable photosensitive organic material such as polyimide or acrylic, for example. The interlayer insulating film 21 functions as a foundation film (a flattening film) of the light-emitting element ED.

The drain portion Da (the drain of the transistor TRy) of the semiconductor film 15a is connected to the electrode Ec that fills in a contact hole Ha of the interlayer insulating film 21 with the electrode Eb interposed therebetween, and the electrode Ec is connected to the pixel electrode 28 in the contact hole Hb of the flattening film 27. Note that the capacitance Cs (see FIG. 1(b)) is formed at a portion where the drain portion Da and the electrode Ee overlap each other with the inorganic insulating film 16 interposed between the drain portion Da and the electrode Ee. The source portion Sb of the semiconductor film 15b (the source of the transistor TRz) is connected to the anode 22 that fills in a contact hole of the interlayer insulating film 21 with the electrode Eh interposed therebetween.

The anode 22, the light reflective film Rf, and the electrode Ec are a light reflective layered film in which an Ag alloy film is sandwiched between two Indium Tin Oxide (ITO) films, for example, and can be formed on the interlayer insulating film 21 in the same step (in the same layer).

An electrode cover film 23 is an organic insulating film and formed by applying a photosensitive organic material such as a polyimide or an acrylic and then by patterning the photosensitive organic material by photolithography, for example.

The light-emitting layer 24 is formed into an island shape for each subpixel by vapor deposition using a Fine Metal Mask (FMM) or an ink-jet method. Although omitted in the drawings, a hole transport layer may be provided between the anode 22 and the light-emitting layer 24.

The cathode 25 is a transparent MgAg alloy film having a thickness of 20 nm or less, for example, and is formed in an island shape for each subpixel. Although omitted in the drawings, an electron transport layer may be provided between the light-emitting layer 24 and the cathode 25. The cathode 25 can be patterned and formed by vapor deposition using the FMM, for example.

In the light-emitting element ED (OLED), positive holes and electrons recombine inside the light-emitting layer 24 in response to a drive current between the anode 22 and the cathode 25, and light is emitted as a result of excitons, which are generated by the recombination, falling into a ground state. Since the cathode 25 is transparent and the anode 22 is light-reflective, the light emitted from the light-emitting layer 24 travels upwards, which results in top emission (upward light emission).

The sealing film 26 is a layered film including two inorganic sealing films and is formed in an island shape such that the light-emitting element ED is covered with the sealing film 26 for each subpixel. The inorganic sealing film can be configured by a silicon oxide film, a silicon nitride film, a silicon oxynitride film, or a layered film thereof, formed by CVD, for example. A coatable organic film such as acrylic can be disposed between the two inorganic sealing films by an ink-jet method, for example. In a case that foreign matter is present inside or on the first inorganic sealing film (a lower film), separate portions of the second inorganic sealing film (an upper film) are formed at a stepped portion caused by the foreign matter, which results in deterioration of sealing performance; however, the coatable organic film can prevent the sealing performance from deteriorating.

The flattening film 27 is a film covering the light reflective film Rf and the sealing film 26 and can be formed of a coatable photosensitive organic material such as polyimide or acrylic, for example.

The pixel electrode 28 is formed on the flattening film 27 for each subpixel using a transparent conductive material such as ITO or IZO. The alignment film Fx covering the pixel electrode 28 can be formed using polyimide or the like; however, the alignment treatment (pretilt addition) in which rubbing or UV irradiation is performed is not performed in consideration of the effect on the light-emitting element ED.

The liquid crystal layer 30 is a vertical alignment (VA) mode liquid crystal layer which is of a normally black type, and the alignment film Fy of the second substrate 2 is subjected to an alignment treatment (pretilt addition). The color (red, green, and blue) of the color filter CF is defined for each subpixel. The counter electrode Ce is a common electrode supplied with a common electrical potential Vcom and is formed using a transparent conductive material such as ITO or IZO.

The circular polarizer 40 is formed by a combination of a linear polarizer and a ¼ wavelength phase difference plate, for example. The circular polarizer is set such that in a case that the liquid crystal layer 30 is in a vertical alignment state (in a case that a voltage across the LD is minimum), a phase of light passing through the liquid crystal layer is not shifted, for example, and this causes the minimum transmission of external light passing through the circular polarizer 40 and the liquid crystal layer 30, reflected from the light reflective film Rf, and returned to the circular polarizer 40 again (black display). Meanwhile, the circular polarizer is set such that in a case that the liquid crystal layer 30 is in a horizontal alignment state (in a case that a voltage across the LD is maximum), a phase of light passing through the liquid crystal layer is shifted by a ¼ wavelength, and this causes the maximum transmission of external light passing through the circular polarizer 40 and the liquid crystal layer 30, reflected from the light reflective film Rf, and returned to the circular polarizer 40 again (white display).

Figure 3:
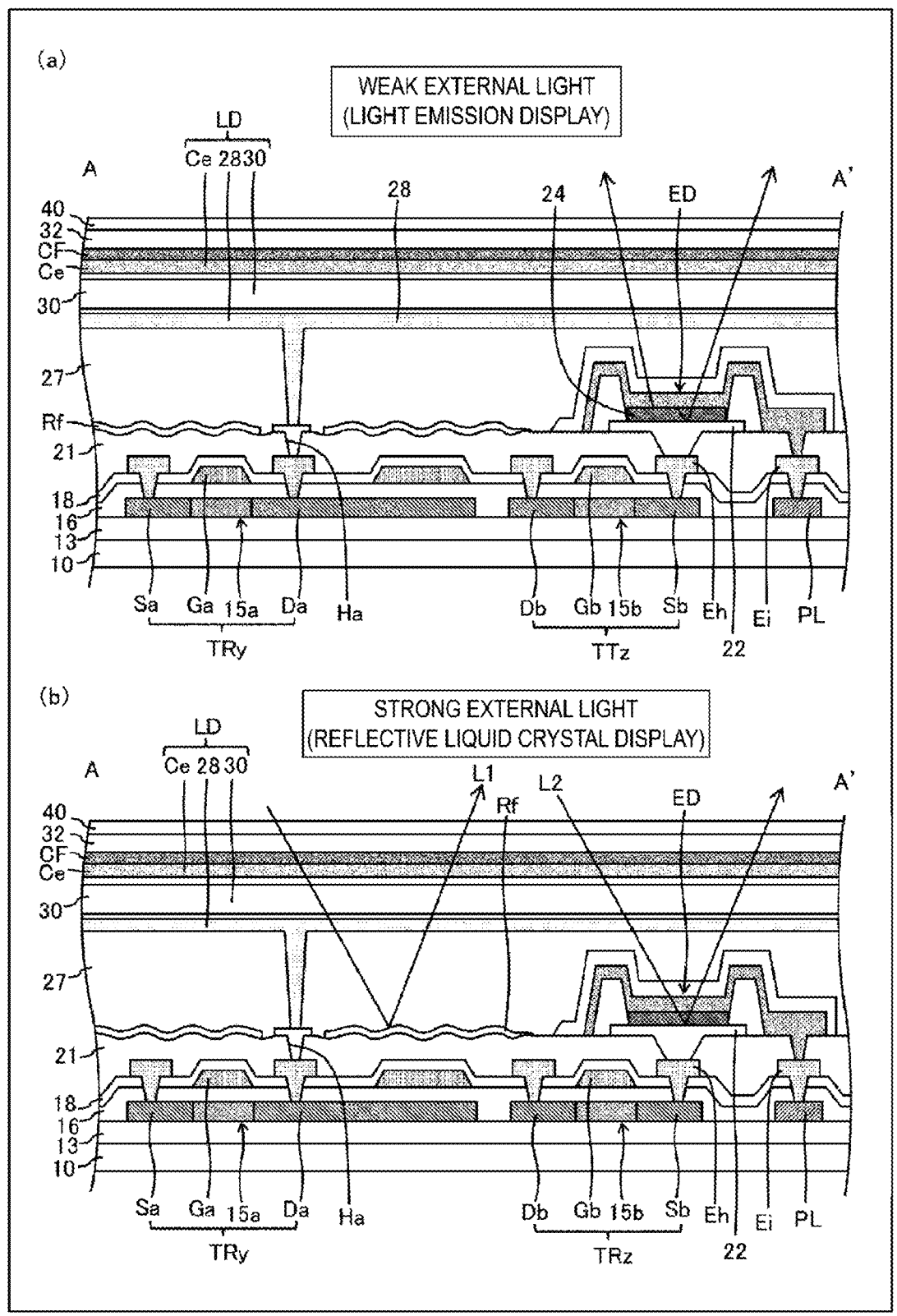
FIG. 3 is a cross-sectional view illustrating a display principle of a display device according to the first embodiment.

FIG. 3 is a cross-sectional view illustrating a display principle of a display device according to the first embodiment. In a case that the amount of external light obtained by the external light sensor LS is less than a threshold, the display control circuit DCC illustrated in FIG. 1 sets the subpixel to a first mode in which the light emission display is performed by the light-emitting element ED as illustrated in FIG. 3(a). In a case that the amount of external light is equal to or greater than the threshold, the display control circuit DCC sets the subpixel to a second mode in which the light-emitting element ED does not emit light and the reflective liquid crystal display is performed by the reflective liquid crystal element LD as illustrated in FIG. 3(b). This can prevent the light emission display from deteriorating under strong external light and achieve low power consumption.

As illustrated in FIGS. 2 and 3, the first substrate 1 is provided with: the sealing film 26 having an island shape and covering the light-emitting element ED, the pixel electrode 28 including a first portion P1 that does not overlap the sealing film 26, and the light reflective film Rf that overlaps the first portion P1 and includes a recessed and protruded surface. Since the light-emitting element is not formed in a region overlapping the first portion P1, the region can be designed suitably for the reflective liquid crystal display, and a reflective angle of reflected light can be controlled by the light reflective film Rf. This can achieve high-quality reflective liquid crystal display.

In the first embodiment, the light reflective film Rf is formed on the interlayer insulating film 21 (the same layer as that of the anode 22 of the light-emitting element ED). When the interlayer insulating film 21 is patterned by photolithography, recesses and protrusions are formed in a predetermined region, and this makes it possible to provide recesses and protrusions to the light reflective film Rf formed on the predetermined region. The recesses and protrusions are formed by changing exposure amounts among: a formation region of the contact hole Ha, a part of the predetermined region (a protrusion formation region), and another part of the predetermined region (a recess formation region), for example. Since an angle of the recessed and protruded surface can be controlled by the size of an exposure pattern and the amount of exposure, the reflective liquid crystal display with a great luminance can be achieved.

Note that a region of the interlayer insulating film 21 that overlaps the anode 22 of the light-emitting element ED is flat. This makes the surface of the anode 22 flat, and the light-emitting layer 24 can be favorably vapor deposited and formed. Furthermore, in a case that a MgAg alloy film (with light transparency and light reflectivity) having a thickness of 20 nm or less is used for the cathode 25, a portion between the anode 22 and the cathode 25 can function as a microcavity, and the purity of the light emission color can be increased.

In the first embodiment, the pixel electrode 28 includes a second portion P2 that overlaps the sealing film 26. Specifically, the anode 22 of the light-emitting element ED includes an edge portion 22e covered with the electrode cover film 23 and a non-edge portion 22k (an exposed portion under an opening 23k of the electrode cover film 23) that is not covered with the electrode cover film 23, and the entirety of the non-edge portion 22k overlaps the light-emitting layer 24, the cathode 25, the sealing film 26, and the second portion P2 of the pixel electrode 28.

Accordingly, the first portion P1 and the second portion P2 of the pixel electrode 28 can be used for the reflective liquid crystal element LD, and in FIG. 3(b), external light L1 that is reflected from the light reflective film Rf and passes through the first portion P1, and external light L2 that is reflected from the anode 22 and passes through the second portion P2 can contribute to the display. As a result, the luminance when performing the reflective liquid crystal display can be increased. Note that the light reflective film Rf is formed and does not overlap the cathode 25 of the light-emitting element ED.

Figure 4:
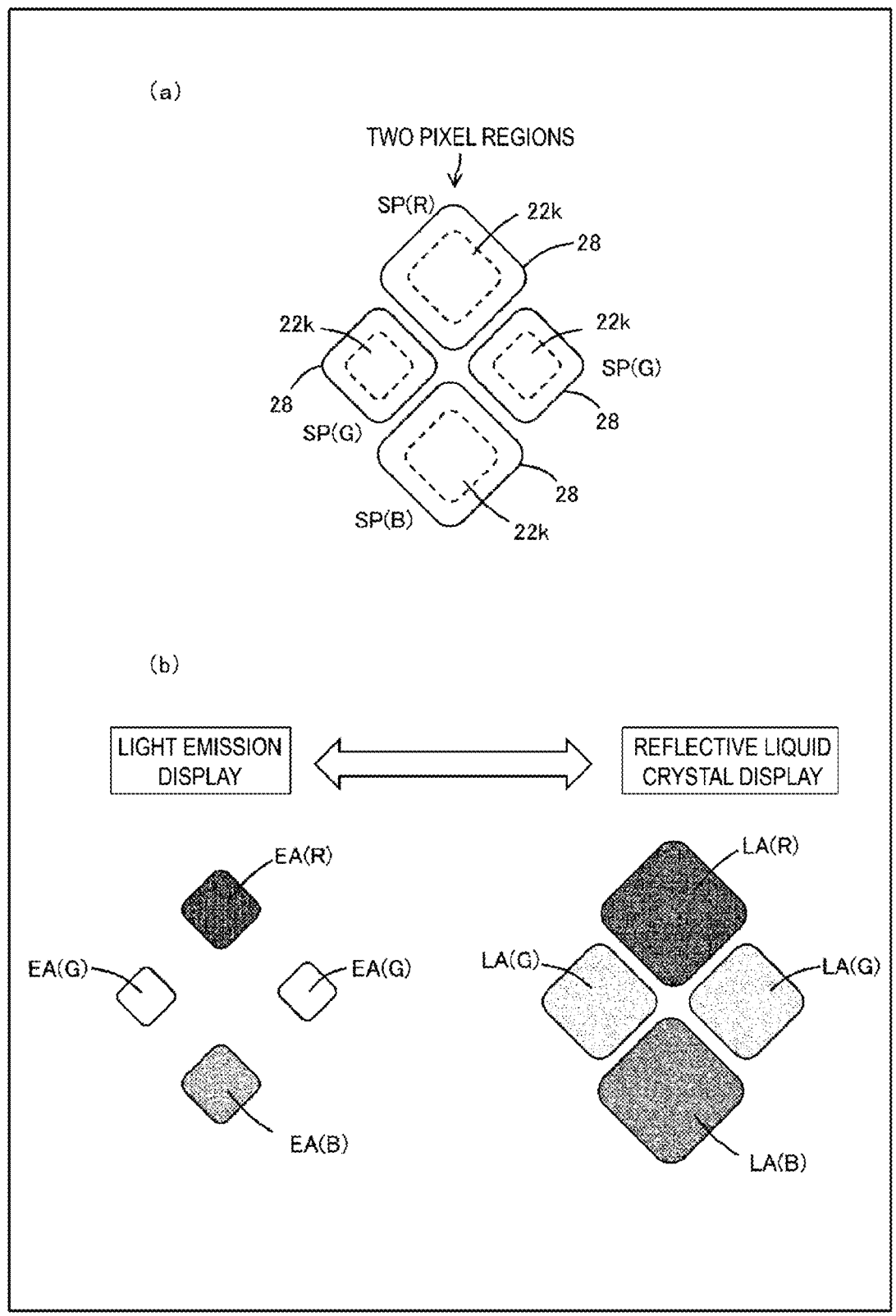
FIG. 4(a) is a plan view illustrating two pixel regions of a display device according to the first embodiment.
FIG. 4(b) is a plan view illustrating a display example of the two pixel regions (in a case of strong external light and in a case of weak external light).

FIG. 4(a) is a plan view illustrating two pixel regions of a display device according to the first embodiment, and FIG. 4(b) is a plan view illustrating a display example of the two pixel regions (in a case of strong external light and in a case of weak external light). As illustrated in FIGS. 2 and 4, in a plan view, the non-edge portion 22k of the anode 22 is positioned inside the outer periphery of the pixel electrode 28, and the first portion P1 of the pixel electrode 28 (a portion that does not overlap the sealing film 26) surrounds the second portion P2 (a portion that overlaps the sealing film 26). That is, in a plan view, a light-emitting region EA of the light-emitting element ED is positioned inside the outer periphery of the pixel electrode 28, and the center of the pixel electrode 28 coincides with the center of the light-emitting region EA. A light-emitting region LA(R) of the red subpixel, a light-emitting region LA(G) of the green subpixel, and a light-emitting region LA(B) of the blue subpixel, when performing the reflective liquid crystal display, can be made larger than, respectively, a light-emitting region EA(R) of the red subpixel, a light-emitting region EA(G) of the green subpixel, and a light-emitting region EA(B) of the blue subpixel, when performing the light emission display. Thus, the quality of the reflective liquid crystal display can be increased. Furthermore, even in a case where the light emission display and the reflective liquid crystal display are switched, the luminance center of the subpixel does not change. This reduces a feeling of strangeness when display is switched. In FIG. 1, 4, or the like, red, green, and blue subpixels are disposed in a pentile manner, but this is merely an example.

The flattening film 27 is provided in an upper layer than the sealing film 26 and in a lower layer than the pixel electrode 28 and overlaps the first portion P1 and the second portion P2 of the pixel electrode 28. This allows the liquid crystal layer 30 overlapping the first portion P1 and the liquid crystal layer 30 overlapping the second portion P2 to have the same thickness (gap), and the quality of the reflective liquid crystal display can be increased.

The first portion P1 of the pixel electrode 28 (a portion that does not overlap the sealing film 26), the pixel electrode 28 being formed in an upper layer than the sealing film 26 having an island shape, is connected to the transistor TRy, with the contact hole Ha of the interlayer insulating film 21 and the contact hole Hb of the flattening film 27 interposed therebetween. Since the pixel electrode 28 and the transistor TRy are electrically connected without forming holes in the sealing film 26, the sealing effect can be increased, and the deterioration of the light-emitting element ED can be suppressed.

Second Embodiment

Figure 5:
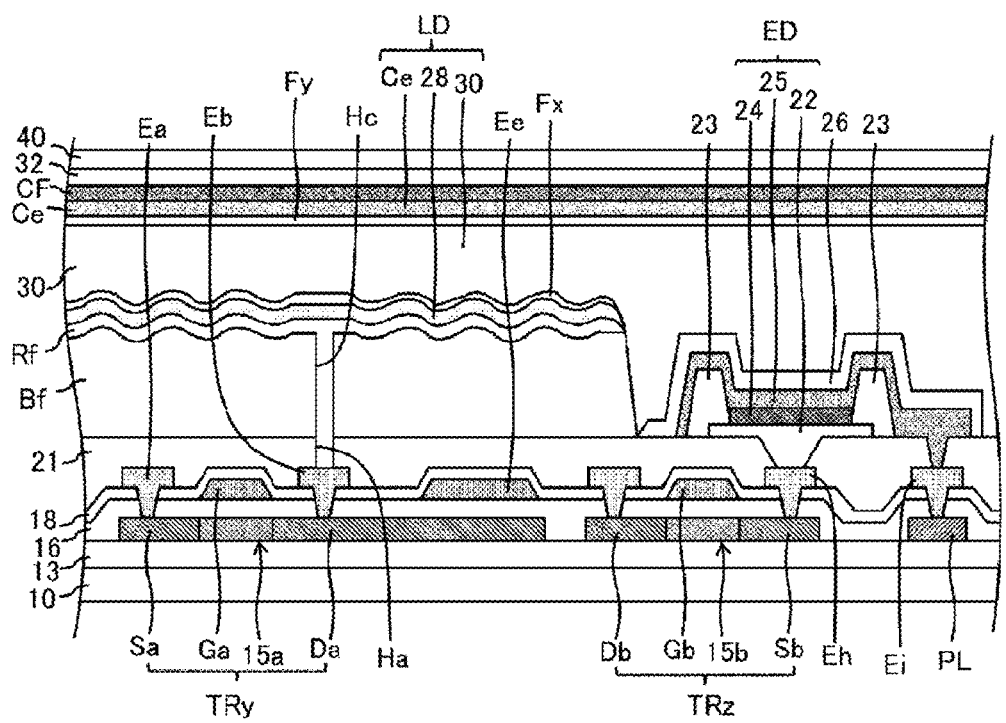
FIG. 5 is a cross-sectional view illustrating a display device according to a second embodiment.

FIG. 5 is a cross-sectional view illustrating a display device according to the second embodiment. In the second embodiment, a buffer film Bf is provided in the same layer as that of the electrode cover film 23 covering the anode 22 of the light-emitting element, the buffer film Bf includes a region including a recessed and protruded surface, and the light reflective film Rf is formed on this region. The pixel electrode 28 is formed on the light reflective film Rf. The pixel electrode 28 (a first portion) is connected to the transistor TRy, with the contact hole Ha of the interlayer insulating film 21 and a contact hole Hc of the buffer film Bf interposed therebetween.

Since the light reflective film Rf is formed on the buffer film Bf formed in the same step as that of the electrode cover film 23, the manufacturing steps can be reduced. In a case that an upper face level of the buffer film Bf is set to an upper face level of the sealing film 26, the liquid crystal layer 30 overlapping the first portion P1 and the liquid crystal layer 30 overlapping the second portion P2 have the same thickness (gap), and the quality of the reflective liquid crystal display can be increased.

Third Embodiment

Figure 6:
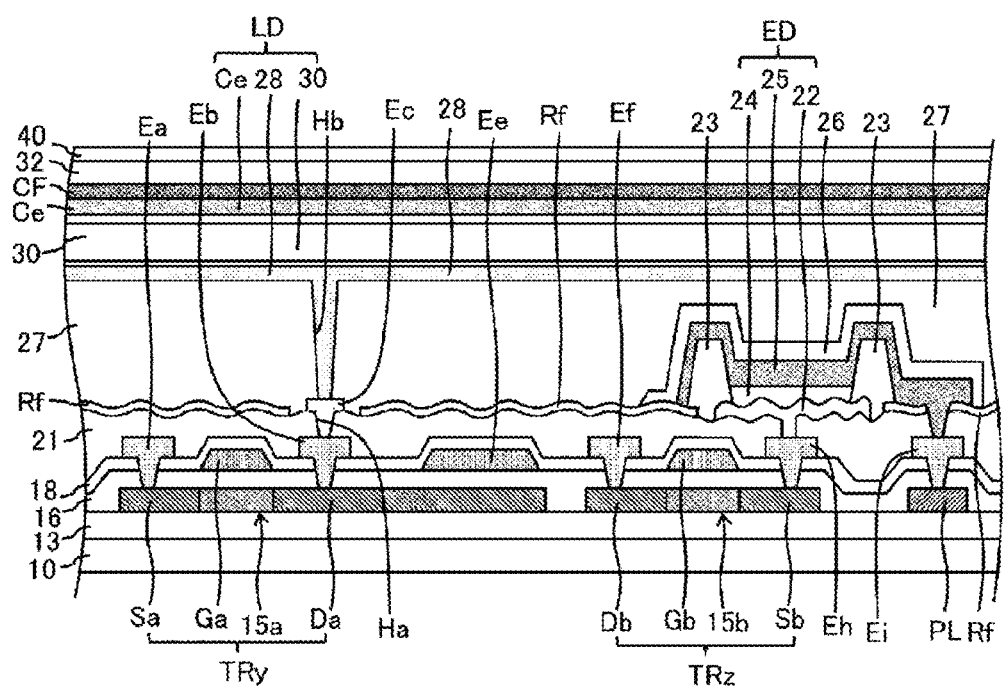
FIG. 6 is a cross-sectional view illustrating a display device according to a third embodiment.

FIG. 6 is a cross-sectional view illustrating a display device according to the third embodiment. In the third embodiment, the light reflective film Rf including a recessed and protruded surface overlaps the light-emitting element ED, and recesses and protrusions are also formed on a surface of the anode 22 in the same layer as that of the light reflective film Rf (formed in the same step). This allows reflected light to be diffused effectively in a formation region of the light-emitting element ED, and the quality of the reflective liquid crystal display can be increased. In addition, since the edge of the sealing film 26 is in contact with the light reflective film Rf, which is an inorganic film, and bonding properties between the two films are excellent, great sealing effect is achieved. In a configuration illustrated in FIG. 6, the light reflective film Rf and the cathode 25 are in contact with each other, and the cathode electrical potential is supplied to the light reflective film Rf. A configuration is also possible in which the light reflective film Rf and the cathode 25 are not in contact with each other.

Fourth Embodiment

Figure 7:
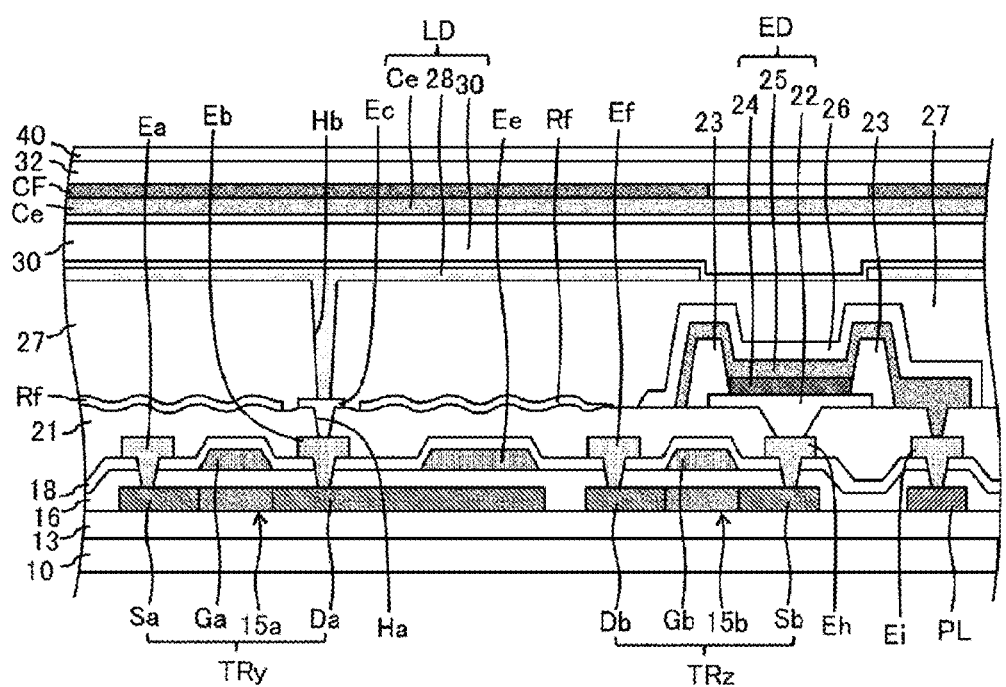
FIG. 7 is a cross-sectional view illustrating a display device according to a fourth embodiment.

FIG. 7 is a cross-sectional view illustrating a display device according to the fourth embodiment. In the first embodiment, the pixel electrode 28 (the second portion P2) overlaps the light-emitting region of the light-emitting element (a region above the non-edge portion 22k of the anode 22); however, no such limitation is intended. As illustrated in FIG. 7, a configuration is possible in which the pixel electrode 28 and the color filter CF are not formed above the light-emitting region of the light-emitting element ED. Since a majority of light emitted from the light-emitting element ED does not pass through the color filter, the luminance of the light emission display can be increased.

Fifth Embodiment

Figure 8:
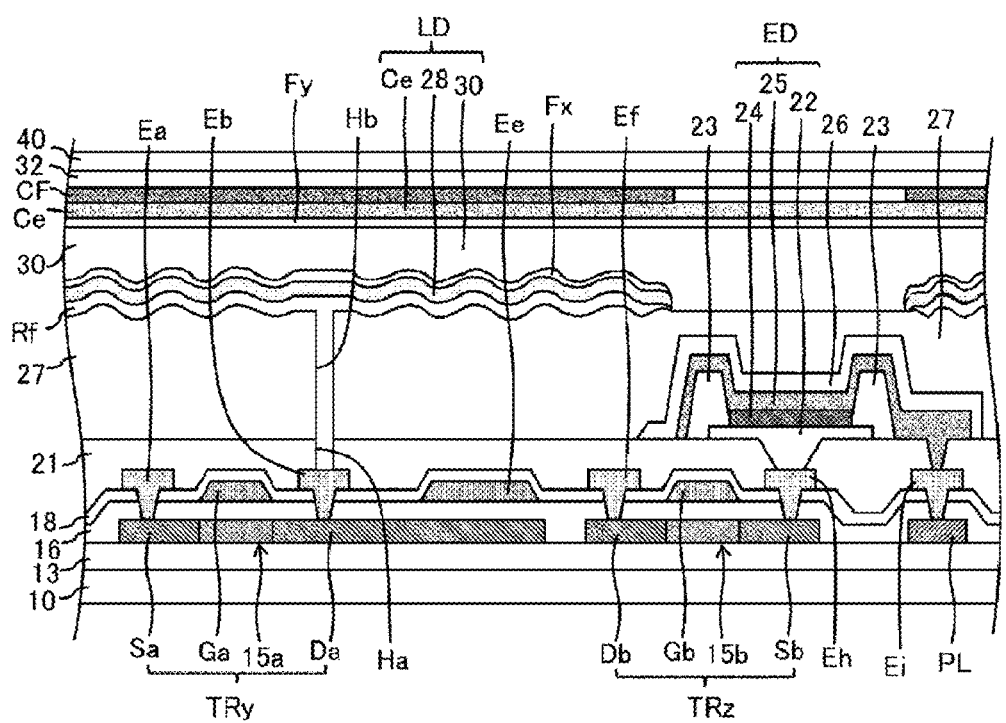
FIG. 8 is a cross-sectional view illustrating a display device according to a fifth embodiment.

FIG. 8 is a cross-sectional view illustrating a display device according to the fifth embodiment. In the first and second embodiments, the light reflective film Rf is formed on the interlayer insulating film 21; however, no such limitation is intended. As illustrated in FIG. 8, a configuration is possible in which the light reflective film Rf including a recessed and protruded surface is formed on the flattening film 27, and the pixel electrode 28 is formed on the light reflective film Rf. A configuration in FIG. 8 is such that the pixel electrode 28 and the color filter CF are not formed above the light-emitting region of the light-emitting element ED; however, no such limitation is intended. As in the first embodiment, a configuration is possible in which the pixel electrode 28 (the second portion) overlaps the light-emitting region of the light-emitting element.

Supplement

An electro-optical element (an electro-optical element whose luminance and transmittance are controlled by an electric current) that is provided in a display device according to the present embodiment is not particularly limited thereto. Examples of the display device according to the present embodiment include an organic Electro Luminescence (EL) display provided with the Organic Light Emitting Diode (OLED) as the electro-optical element, an inorganic EL display provided with an inorganic light emitting diode as the electro-optical element, and a Quantum dot Light Emitting Diode (QLED) display provided with a QLED as the electro-optical element.

First Aspect

A display device includes a first substrate including a light-emitting element that is an upward light emission type and a transistor in a lower layer than the light-emitting element, a second substrate facing the first substrate, and a liquid crystal layer disposed between the first substrate and the second substrate. The first substrate includes a sealing film formed in an island shape and covering the light-emitting element, a pixel electrode including a first portion not overlapping the sealing film, and a light reflective film overlapping the first portion and including a recessed and protruded surface.

Second Aspect

The display device described in aspect 1, for example, wherein an interlayer insulating film is provided in an upper layer than the transistor and in a lower layer than the light-emitting element, and the interlayer insulating film includes a region including a recessed and protruded surface, the light reflective film being formed on the region.

Third Aspect

The display device described in aspect 2, for example, wherein the light reflective film is formed in a layer identical to a layer of a lower electrode of the light-emitting element.

Fourth Aspect

The display device described in aspect 2 or 3, for example, wherein a region of the interlayer insulating film overlapping a lower electrode of the light-emitting element is flat.

Fifth Aspect

The display device described in aspect 1, for example, wherein a buffer film is provided in a layer identical to a layer of an electrode cover film covering a lower electrode of the light-emitting element, and the buffer film includes a region including a recessed and protruded surface, the light reflective film being formed on the region.

Sixth Aspect

The display device described in aspect 1, for example, wherein a flattening film is provided in an upper layer than the sealing film and in a lower layer than the pixel electrode, and the flattening film includes a region including a recessed and protruded surface, the light reflective film being formed on the region.

Seventh Aspect

The display device described in any one of aspects 1 to 6, for example, wherein the pixel electrode is provided in an upper layer than the sealing film, and a first portion of the pixel electrode and the transistor are connected with a contact hole interposed between the first portion and the transistor.

Eighth Aspect

The display device described in any one of aspects 1 to 7, for example, wherein the pixel electrode includes a second portion overlapping the sealing film.

Ninth Aspect

The display device described in aspect 8, for example, wherein the light reflective film overlaps the second portion.

Tenth Aspect

The display device described in any one of aspects 1 to 8, for example, wherein the light reflective film does not overlap an upper electrode of the light-emitting element.

Eleventh Aspect

The display device described in any one of aspects 1 to 10, for example, wherein the sealing film and the pixel electrode are provided for each subpixel.

Twelfth Aspect

The display device described in aspect 11, for example, wherein a reflective liquid crystal element including the pixel electrode and the liquid crystal layer; and the light-emitting element covered with the sealing film are provided for each subpixel, and a first mode in which light emission display is performed by the light-emitting element and a second mode in which the light-emitting element does not emit light and reflective liquid crystal display is performed by the reflective liquid crystal element are switched depending on an amount of external light.

REFERENCE SIGNS LIST

1 First substrate
2 Second substrate
3 Display device
10 Base material
13 Barrier layer
16, 18 Inorganic insulating film
21 Interlayer insulating film
22 Anode (lower electrode)
23 Electrode cover film
24 Light-emitting layer
25 Cathode (upper electrode)
26 Sealing film
27 Flattening film
28 Pixel electrode
30 Liquid crystal layer
40 Circular polarizer
P1 First portion
P2 Second portion
ED Light-emitting element
LD Reflective liquid crystal element
Rf Light reflective film
Fx, Fy Alignment film
Bf Buffer film
Ce Counter electrode
CF Color filter
Ha, Hb, Hc Contact hole
TRx to TRz Transistor

The invention claimed is:

1. A display device comprising:
 a first substrate including:
  a light-emitting element that is an upward light emission type, and
  a transistor in a lower layer than the light-emitting element;
 a second substrate opposing the first substrate; and
 a liquid crystal layer between the first substrate and the second substrate, wherein
 the first substrate includes:
  a sealing film in an island shape and covering the light-emitting element,
  a pixel electrode including a first portion not overlapping the sealing film, and
  a light reflective film overlapping the first portion and including a recessed and protruded surface,
 a flattening film is in a layer above the sealing film and lower than the pixel electrode, and
 the flattening film is on the light reflective film.

2. The display device according to claim 1, wherein
 an interlayer insulating film is provided in a layer above the transistor and lower than the light-emitting element, and
 the interlayer insulating film includes a region including a recessed and protruded surface, the light reflective film being formed on the region.

3. The display device according to claim 2, wherein the light reflective film is formed in a layer identical to a layer of a lower electrode of the light-emitting element.

4. The display device according to claim 2, wherein a region of the interlayer insulating film overlapping a lower electrode of the light-emitting element is flat.

5. The display device according to claim 1, wherein a buffer film is provided in a layer identical to a layer of an electrode cover film covering a lower electrode of the light-emitting element, and the buffer film includes a region including a recessed and protruded surface, the light reflective film being formed on the region.

6. The display device according to claim 1, wherein the pixel electrode is provided in an upper layer than the sealing film, and a first portion of the pixel electrode and the transistor are connected with a contact hole interposed between the first portion and the transistor.

7. The display device according to claim 1, wherein the pixel electrode includes a second portion overlapping the sealing film.

8. The display device according to claim 7, wherein the light reflective film overlaps the second portion.

9. The display device according to claim 1, wherein the light reflective film does not overlap an upper electrode of the light-emitting element.

10. The display device according to claim 1, wherein the sealing film and the pixel electrode are provided for each subpixel.

11. The display device according to claim 10, wherein a reflective liquid crystal element including the pixel electrode and the liquid crystal layer; and the light-emitting element covered with the sealing film are provided for each subpixel, and a first mode in which light emission display is performed by the light-emitting element and a second mode in which the light-emitting element does not emit light and reflective liquid crystal display is performed by the reflective liquid crystal element are switched depending on an amount of external light.

* * * * *